(12) United States Patent
Matsui et al.

(10) Patent No.: US 11,519,056 B2
(45) Date of Patent: Dec. 6, 2022

(54) NI-BASED SUPER-HEAT-RESISTANT ALLOY FOR AIRCRAFT ENGINE CASES, AND AIRCRAFT ENGINE CASE FORMED OF SAME

(71) Applicant: HITACHI METALS, LTD., Tokyo (JP)

(72) Inventors: Takanori Matsui, Tokyo (JP); Tadashi Fukuda, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 63 days.

(21) Appl. No.: 16/970,887

(22) PCT Filed: Sep. 26, 2019

(86) PCT No.: PCT/JP2019/037757
§ 371 (c)(1),
(2) Date: Aug. 18, 2020

(87) PCT Pub. No.: WO2020/067239
PCT Pub. Date: Apr. 2, 2020

(65) Prior Publication Data
US 2020/0407825 A1    Dec. 31, 2020

(30) Foreign Application Priority Data
Sep. 26, 2018    (JP) .............................. JP2018-181020

(51) Int. Cl.
*C22C 19/05*    (2006.01)
*C22F 1/10*    (2006.01)
*F01D 25/24*    (2006.01)
*F02C 7/00*    (2006.01)

(52) U.S. Cl.
CPC .............. *C22C 19/056* (2013.01); *C22F 1/10* (2013.01); *F01D 25/24* (2013.01); *F02C 7/00* (2013.01); *F05D 2300/175* (2013.01)

(58) Field of Classification Search
CPC ................................. C22C 19/056; C22F 1/10
See application file for complete search history.

(56) References Cited

U.S. PATENT DOCUMENTS

| | | | |
|---|---|---|---|
| 4,108,648 | A | 8/1978 | Zhurkina et al. |
| 6,478,897 | B1 * | 11/2002 | Izumida ................. C22C 19/057 148/908 |
| 2006/0157171 | A1 | 7/2006 | Ueta et al. |
| 2015/0284823 | A1 | 10/2015 | Osaki et al. |
| 2016/0160334 | A1 | 6/2016 | Imano et al. |

FOREIGN PATENT DOCUMENTS

| | | |
|---|---|---|
| CN | 105143481 A | 12/2015 |
| CN | 105154719 A | 12/2015 |
| EP | 2537951 A1 | 12/2012 |
| EP | 3023509 A1 | 5/2016 |
| JP | 2004197150 A | 7/2004 |
| JP | 2005-525470 A | 8/2005 |
| JP | 2007113057 A | 5/2007 |
| JP | 2013-159842 A | 8/2013 |
| JP | 2014-5528 A | 1/2014 |
| JP | 2015-129341 A | 7/2015 |
| JP | 2015-165046 A | 9/2015 |
| JP | 2015-199980 A | 11/2015 |
| WO | 03/097888 A1 | 11/2003 |
| WO | 2015/008343 A1 | 1/2015 |

OTHER PUBLICATIONS

English translation of International Search Report, International Application No. PCT/JP2019/037757, dated Dec. 17, 2019, 2 pp.
"First Office Action and English language translation", CN Patent Application No. 201980017707.4, dated Apr. 21, 2021.
"Communication with Supplementary European Search Report", EP Application No. 19867795.7, dated Feb. 25, 2021, 9 pp.

* cited by examiner

*Primary Examiner* — Jessee R Roe
(74) *Attorney, Agent, or Firm* — Myers Bigel, P.A.

(57) ABSTRACT

Provided are a Ni-based heat resistant superalloy for aircraft engine cases excellent in high-temperature characteristic such as tensile characteristics and low-cycle fatigue characteristics in a high-temperature range and also excellent in workability, and an aircraft engine case formed of the same. The Ni-based heat resistant superalloy has composition containing, by mass, Co: 4.0 to 11.0%, Cr: 12.0 to 17.0%, Al: 2.0 to 4.0%, Ti: 2.0 to 4.0%, Al+Ti: 4.6 to 6.7%, Mo: more than 5.5 to 10.0%, W: more than 0 to 4.0%, B: 0.001 to 0.040%, C: 0.02 to 0.06%, Zr: 0 to 0.05%, Mg: 0 to 0.005%, P: 0 to 0.01%, Nb: 0 to 1.0%, Ta: 0 to 1.0%, and Fe: 0 to 2.0%, and the balance of Ni with inevitable impurities, and is suitable for aircraft engine cases.

3 Claims, 2 Drawing Sheets

100 μm

100 μm

NI-BASED SUPER-HEAT-RESISTANT ALLOY FOR AIRCRAFT ENGINE CASES, AND AIRCRAFT ENGINE CASE FORMED OF SAME

RELATED APPLICATIONS

This application is a 35 U.S.C. § 371 national stage application of PCT Application No. PCT/JP2019/037757, filed on Sep. 26, 2019, which claims priority from Japanese Patent Application No. 2018-181020, filed on Sep. 26, 2018, the contents of which are incorporated herein by reference in their entireties. The above-referenced PCT International Application was published in the Japanese language as International Publication No. WO 2020/067239 A1 on Apr. 2, 2020.

TECHNICAL FIELD

This invention relates to a Ni-based heat resistant superalloy for aircraft engine cases and an aircraft engine case formed of the same. In particular, this invention relates to a Ni-based heat resistant superalloy for aircraft engine cases having excellent high-temperature material characteristics such as tensile characteristics and low-cycle fatigue characteristics in a high-temperature range and also excellent workability, and relates to an aircraft engine case formed of the same.

BACKGROUND ART

Ni-based heat resistant superalloys have excellent strength, toughness, corrosion resistance, oxidation resistance, etc., and as such, are utilized in various technical fields that require heat resistance, including engine members for aircrafts, members for electricity-generating gas turbines, and the like.

In particular, structural members for aircraft engines require higher combustion temperatures for improvement in fuel efficiency. Ni-based heat resistant superalloys having much better high-temperature characteristic are demanded.

Many Ni-based heat resistant superalloys are under development to respond to this request.

For example, Patent Document 1 discloses, for the purpose of providing an affordable, weldable, hot workable nickel-based alloy that has high temperature capability, a "nickel-base alloy comprising, in weight %: up to about 0.10% carbon; about 12% up to about 20% chromium; up to about 4% molybdenum; up to about 6% tungsten (wherein the sum of molybdenum and tungsten is at least about 2% and not more than about 8%); about 5% up to about 12% cobalt; up to about 14% iron; about 4% up to about 8% niobium; about 0.6% up to about 2.6% aluminum; about 0.4% up to about 1.4% titanium; about 0.003% up to about 0.03% phosphorous; about 0.003% up to about 0.015% boron; nickel; and incidental impurities, and wherein the sum of atomic percent aluminum and atomic percent titanium is from about 2% to about 6%, the ratio of atomic percent aluminum to atomic percent titanium is at least about 1.5, and the atomic percent of aluminum plus titanium divided by the atomic percent of niobium equals about 0.8 to about 1.3" (see claim 1), and states that the nickel-based alloy can be used in components for gas turbine engines (e.g., disks, blades, fasteners, cases, and shafts).

Patent Document 1 discloses that commercially available Ni-based heat resistant superalloys, Alloy 718 (conforming to UNS N07718) and Waspaloy-equivalent alloy (conforming to UNS N07001) are adopted as conventional alloys for comparison, and reports that: the tensile strength and temperature stability of the Ni alloy described in Patent Document 1 are very close to the values of Waspaloy-equivalent alloy and much better than those of Alloy 718; the Ni alloy described in Patent Document 1 is superior in stress rupture properties and creep life to Alloy 718 and Waspaloy-equivalent alloy; and the Ni alloy described in Patent Document 1 has equivalent temperature stability as to time-dependent stress rupture properties and creep characteristics as compared with Waspaloy-equivalent alloy, and therefore possesses all of higher tensile strength, stress rupture properties, creep life and long-time temperature stability than those of Alloy718 and Waspaloy-equivalent alloy and retains better hot workability and weldability, and is more advantageous in cost than these alloys.

In this context, the "UNS" refers to "Unified Numbering System" stipulated in SAE HS-1086 and ASTM DS-566, and the N07718 or the N07001 denotes a unique number of an alloy registered therein.

Patent Document 1 has reported that the typical component composition of Alloy 718 is "by mass, C: 0.08% maximum, Mn: 0.35% maximum, P: 0.015% maximum, S: 0.015% maximum, Si: 0.35% maximum, Cr: 17 to 21%, Ni: 50 to 55%, Mo: 2.8 to 3.3%, Nb plus Ta: 4.75 to 5.5%, Ti: 0.65 to 1.15%, Al: 0.2 to 0.8%, Co: 1% maximum, B: 0.006% maximum, Cu: 0.3% maximum, and the balance of Fe with incidental impurities", and also reported that the typical component composition of Waspaloy-equivalent alloy is "by mass, C: 0.02 to 0.10%, Mn: 0.1% maximum, P: 0.015% maximum, S: 0.015% maximum, Si: 0.15% maximum, Cr: 18 to 21%, Fe: 2% maximum, Mo: 3.5 to 5.0%, Ti: 2.75 to 3.25%, Al: 1.2 to 1.6%, Co: 12 to 15%, B: 0.003 to 0.01%, Cu: 0.1% maximum, and Zr: 0.02 to 0.08%, and the balance of Ni with incidental impurities".

REFERENCE DOCUMENT LIST

Patent Document

Patent Document 1: JP 2005-525470 A

SUMMARY OF THE INVENTION

Problem to be Solved by the Invention

In recent years, higher combustion temperatures have been studied as one measure to improve fuel efficiency, due to a high ratio of fuel cost to aircraft maintenance cost. Such higher combustion temperatures tend to elevate the use temperatures of materials.

However, Ni-based heat resistant superalloys, including conventional Ni-based heat resistant superalloys as mentioned in Patent Document 1, achieve high strength by using precipitation strengthening with an intermetallic compound as a primary strengthening method. Their strength characteristics are easily changed during use because phase change becomes more marked as the use temperatures are elevated. Hence, it is difficult to maintain designed initial characteristics.

In particular, engine cases for aircrafts are members for which the environment of use involves high temperatures. For example, combustors are used in an environment exposed to combustion gas. Therefore, their use temperatures are elevated. Some engine members achieve operation, without causing practical problems, by limited use temperatures or lengths of times of use. Such a member is typically a disk positioned between a blade and a shaft in a rotor unit. The inside diameter side in contact with the shaft has a relatively low temperature, whereas the outside diameter side in contact with the blade has a high temperature. The disk located anteriorly in a high-pressure turbine where the temperature becomes highest may reach approximately 700° C. Accordingly, melted or forged Ni-based heat resistant superalloys for disks, which endure approximately 700° C. under limitations to time, have been proposed. Unlike the disk, cases do not undergo large stress, but may have a higher use temperature than that of the disk, as in the combustors mentioned above. Hence, in an attempt to use the previously proposed Ni-based heat resistant superalloys directly in engine cases, the alloys have been used in a region without the optimum mechanical characteristics. Specifically, problems have started to arise in such a way that not only highly versatile conventional Ni-based heat resistant superalloys widely used, but even Ni-based heat resistant superalloys for disks proposed so as to exhibit excellent strength characteristics in a temperature range up to approximately 700° C. under limitations of time are not suitable for combustor cases of engines for which a much higher combustion temperature is required, and have insufficient characteristics.

For such engine cases, attention is paid to deformation or breakage ascribable to the loading of continuous stress less than proof strength resulting from a series of cycles from engine start-up to stop, i.e., the need for high-temperature creep characteristics or high-temperature rupture characteristics. Breakage ascribable to stress loading and stress unloading resulting from this series of cycles, i.e., high-temperature low-cycle fatigue characteristics, are also important characteristics that influence service life. However, there is no proposal focusing on low-cycle fatigue strength at high temperatures.

An object of the present invention is to provide a Ni-based heat resistant superalloy for aircraft engine cases that has sufficient high-temperature strength and excellent low-cycle fatigue strength even if the environment of usage of an engine case becomes a high temperature of 750° C. or higher, and also possesses excellent hot workability, and an aircraft engine case comprising the same.

In the present invention, the "engine case" refers to a combustor case, a high-pressure turbine case, or further, a high-pressure compressor case, a low-pressure turbine case, or the like, for aircraft jet engines. The aircraft engine case is a structural member required for every region from the anterior to posterior regions of an engine.

The present invention is directed to a Ni-based heat resistant superalloy that exerts its features in a high-temperature range and is suitable for aircraft engine cases, and is to be applied mainly to a combustor case and a high-pressure turbine case located posteriorly in the combustor case. These are cylindrical materials and vary in size depending on an engine size (thrust). For example, the outside diameter is 0.3 to 1.5 m, and the height (length in the axial direction of an engine) differs depending on engine design and is 1 m or less.

The Ni-based heat resistant superalloy of the present invention is also to be applied to high-pressure compressor cases located anteriorly in combustors and low-pressure turbine cases located posteriorly in the high-pressure turbine cases, although the use temperatures of these cases are lower than those of combustor cases and high-pressure turbine cases.

The low-pressure turbine cases have a tapered shape where the diameter increases from the anterior toward posterior regions. Large low-pressure turbine cases have a maximum diameter (in a posterior region in an engine) on the order of more than 2 m to 2.5 m or less. On the other hand, the high-pressure compressor cases have a shape in which the diameter increases from the posterior toward the anterior regions, and unlike the low-pressure turbine cases, have no difference in diameter.

Means for Solving the Problem

The present inventors have conducted diligent research on alloy components and composition ranges thereof as to Ni-based heat resistant superalloys as materials for aircraft engine cases that are excellent in high-temperature strength and low-cycle fatigue characteristics in a high-temperature environment of 750° C. or higher and have excellent workability. As a result, the present inventors have discovered the following.

First, the Ni-based heat resistant superalloys usually have a structure of a γ' phase precipitated in a γ phase (matrix) or a structure of a γ" phase precipitated therein, formed for the purpose of high-temperature high strengthening. The conventional γ-γ'-type Ni-based heat resistant superalloys cause rapid reduction in strength with elevation in temperature in a temperature range exceeding 650° C. The γ-γ"-type Ni-based heat resistant superalloys cause more rapid reduction in strength in this temperature range.

However, the present inventors have found that the control of alloy components of a Ni-based heat resistant superalloy and composition thereof to proper ranges improves the ability to strengthen solid solution, in addition to precipitation strengthening, in a temperature range having a small contribution of the γ' phase to strengthening (e.g., 750° C. or higher) so that excellent material characteristics of the Ni-based heat resistant superalloy in a high-temperature range can be secured.

Next, the phase stability of Ni-based heat resistant superalloys is generally emphasized from the viewpoint of exerting, during use, low-cycle fatigue (LCF) characteristics equivalent to those at the start of use. However, precipitation-strengthened alloys cannot avoid phase change when used for a long time at a high temperature.

Accordingly, the present inventors have found that: a Ni-based heat resistant superalloy that exhibits excellent low-cycle fatigue characteristics in a high-temperature range (e.g., 750° C.) can be obtained as a result of reduced strength and improved ductility based on phase change by controlling alloy components of the Ni-based heat resistant superalloy and composition thereof to proper ranges, rather than suppressing the phase change and emphasizing phase stability; and further, the low-cycle fatigue characteristics of the resulting Ni-based heat resistant superalloy after use for a long time in a high-temperature range are almost equivalent (without large deterioration) to the initial low-cycle fatigue characteristics.

Aircraft engine cases are usually prepared by hot-forging a melted ingot to prepare a forged billet, and then subjecting the forged billet to steps such as hot forging, hot rolling, solution treatment, and aging treatment. The present inventors have found that: alloy components of a Ni-based heat resistant superalloy and composition thereof are controlled in proper ranges, and the difference between solvus temperature T1 of a $M_6C$-type carbide and solvus temperature T2 of a γ' phase is decreased and adjusted to within a predetermined range, whereby rapid growth of grains in a temperature range immediately below or immediately above the solvus temperature T2 of the γ' phase is suppressed by the dispersion of the $M_6C$-type carbide while the $M_6C$-type carbide is used as a recrystallization site; and the resulting Ni-based heat resistant superalloy can possess a homogeneous microstructure (grain size and precipitation phase) and be excellent in workability, and as a result, an aircraft engine case that possesses excellent high-temperature performance can be prepared.

This invention has been made on the basis of these findings. A Ni-based heat resistant superalloy for aircraft engine cases and an aircraft engine case formed of the same according to this invention include the following features:
(1) a Ni-based heat resistant superalloy for aircraft engine cases having composition containing, by mass, Co: 4.0 to 11.0%, Cr: 12.0 to 17.0%, Al: 2.0 to 4.0%, Ti: 2.0 to 4.0%, Al+Ti: 4.6 to 6.7%, Mo: more than 5.5 to 10.0%, W: more than 0 to 4.0%, B: 0.001 to 0.040%, C: 0.02 to 0.06%, Zr: up to 0.05%, Mg: up to 0.005%, P: up to 0.01%, Nb: up to 1.0%, Ta: up to 1.0%, and Fe: up to 2.0%, and the balance of Ni with inevitable impurities;
(2) the Ni-based heat resistant superalloy for aircraft engine cases according to (1), wherein a difference between solvus temperature T1 of an $M_6C$-type carbide and solvus temperature T2 of a $\gamma'$ phase (T1-T2) calculated from thermodynamic calculation based on the components and their composition of the Ni-based heat resistant superalloy for aircraft engine cases according to (1) satisfies $-30°$ C.$\leq$(T1-T2)$\leq$+40° C., preferably $-20°$ C.$\leq$(T1-T2)$\leq$+20° C.;
(3) the Ni-based heat resistant superalloy for aircraft engine cases according to (1) or (2), wherein the number of cycles to failure in a low-cycle fatigue test in a total strain range of 0.6% at 750° C. is at least $1.0 \times 10^5$;
(4) the Ni-based heat resistant superalloy for aircraft engine cases according to any one of (1) to (3), wherein tensile strength at 750° C. is at least 1000 MPa; and
(5) an aircraft engine case formed of the Ni-based heat resistant superalloy for aircraft engine cases according to any one of (1) to (4).

The expression "up to . . . %" in (1) mentioned above means "0% or more and . . . % or less".

Effects of the Invention

The Ni-based heat resistant superalloy for aircraft engine cases of this invention has excellent tensile characteristics (high-temperature strength) and low-cycle fatigue characteristics in a high-temperature range as well as excellent workability, and therefore facilitates preparing large engine cases and permits increase in sizes of engines. Hence, the Ni-based heat resistant superalloy for aircraft engine cases of this invention makes a great contribution to improvement in fuel efficiency of aircrafts ascribable to higher combustion temperatures.

In addition to the advantageous effects described above, the Ni-based heat resistant superalloy for aircraft engine cases of this invention has rupture characteristics and is further capable of obtaining excellent high-temperature characteristic with less change in characteristics in a high-temperature range. Hence, the Ni-based heat resistant superalloy for aircraft engine cases of this invention is suitable as a material for constituting aircraft engine cases that are required to have a higher combustion temperature for improvement in fuel efficiency.

MODE FOR CARRYING OUT THE INVENTION

Figure 1:
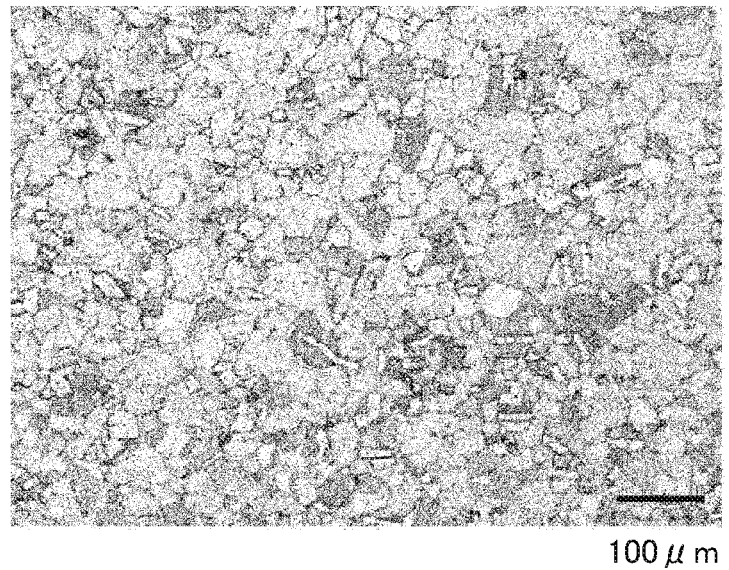
FIG. 1 is a microphotograph showing the microstructure of the alloy of the present invention (Alloy A).

Reasons for limiting the component composition of the Ni-based heat resistant superalloy for aircraft engine cases of this invention, etc. will be described below in detail.

Co:

The Co component typically improves rupture characteristics through solid solution in a matrix ($\gamma$ phase). A content of less than 4.0% by mass (hereinafter, "% by mass" is simply referred to as "%") is not preferred because sufficient rupture characteristics cannot be conferred. On the other hand, more than 11.0% of the component contained reduces hot workability and is therefore not preferred. Thus, the content of Co is set to 4.0 to 11.0%. For more reliably obtaining the effect of Co, the lower limit is preferably 8.0%, more preferably 8.2%. The upper limit of Co is preferably 10.0%.

Cr:

The Cr component improves the high-temperature corrosion resistance, such as high-temperature oxidation resistance and high-temperature sulfidation resistance, of the alloy by forming a favorable protective coating. Furthermore, the Cr component forms a $M_6C$-type carbide with C and elevates the solvus temperature of the $M_6C$-type carbide in a matrix so that grain growth is suppressed by the dispersion of the $M_6C$-type carbide having flux pinning. The Cr component contributes to the granulation of grains by the exertion and progression of recrystallization and improves grain boundary strength. A content of less than 12.0% cannot secure the desired high-temperature corrosion resistance. On the other hand, a content of more than 17.0% rather reduces high-temperature corrosion resistance by precipitating a harmful phase such as a $\sigma$ phase or a $\mu$ phase. Thus, the content is set to 12.0 to 17.0%. For more reliably obtaining the effect of Cr, the lower limit is preferably 13.0%, more preferably 13.5%. The upper limit of Cr is preferably 16.0%, more preferably less than 15.0%, still more preferably 14.8%.

Al:

The Al component constitutes a $\gamma'$ phase ($Ni_3Al$), a primary precipitation strengthening phase, through aging treatment and has an effect of improving high-temperature tensile characteristics, low-cycle fatigue characteristics and rupture characteristics and bringing about high-temperature strength. A content of less than 2.0% cannot secure the desired high-temperature strength due to an insufficient precipitation rate of the $\gamma'$ phase. On the other hand, a content of more than 4.0% reduces hot workability and reduces ductility due to an excessive amount of the $\gamma'$ phase produced, and therefore is not preferred. Thus, the content of Al is set to 2.0 to 4.0%. For more reliably obtaining the effect of Al, the lower limit is preferably 2.2%, more preferably 2.6%. The upper limit of Al is preferably 3.3%, more preferably 3.0%.

Ti:

The Ti component typically has an effect of improving high-temperature tensile characteristics, low-cycle fatigue characteristics and rupture characteristics through solid solution in a $\gamma'$ phase. A content of less than 2.0% cannot secure the desired high-temperature strength due to an insufficient precipitation rate of the $\gamma'$ phase. On the other hand, a content of more than 4.0% reduces hot workability and is therefore not preferred. Thus, the content of Ti is set to 2.0 to 4.0%. For more reliably obtaining the effect of Ti, the lower limit is preferably 2.6%, more preferably 2.9%. The upper limit of Ti is preferably 3.6%, more preferably 3.4%.

Al+Ti:

Each of the content of Al and the content of Ti is 2.0 to 4.0%, as described above. In this invention, the total content of Al and Ti is further set to 4.6% to 6.7%.

The γ' phase is based on $Ni_3Al$. The substitution of the Al position with Ti increases strengthening ability as a precipitation phase. Therefore, the combined addition of Al and Ti brings about further improvement in high-temperature strength. The total amount of the γ' phase is also an important factor from the viewpoint of conferring strength. A larger total content of Al and Ti increases the amount of the γ' phase and therefore enhances strength. A total content of less than 4.6% cannot secure the desired high-temperature strength due to an insufficient amount of the γ' phase precipitated. On the other hand, a total content of more than 6.7% reduces hot workability and is therefore not preferred. The effect of the combined addition of Al and Ti requires defining the individual contents of Al and Ti as well as the range of the total content.

The total content of Al and Ti is set to 4.6% to 6.7%, whereby working effects characteristic of the Ni-based heat resistant superalloy of the present invention are exerted in such a way that high-temperature strength characteristics such as high-temperature tensile characteristics and high-temperature low-cycle fatigue characteristics are excellent while hot plastic workability is also excellent. The lower limit of the total amount of Al and Ti is preferably 5.2%, more preferably 5.5%. The upper limit of the total amount of Al and Ti is preferably 6.3%.

When the "total content of Al and Ti: 4.6% to 6.7%" is re-expressed by an Al equivalent with Al equivalent=Al+ 0.56×Ti, the Al equivalent is 3.8 to 5.5. The lower limit of the Al equivalent is preferably 3.9, more preferably 4.2. The upper limit of the Al equivalent is preferably 4.8.

The quantitative ratio between Al and Ti is preferably 0.7 to 1.1 in terms of a value of Al/Ti.

This is because Al/Ti summarizes the occupation ratio between Al and Ti at the Al position of the γ' phase based on $Ni_3Al$ and the effect of the combined addition is further enhanced. The lower limit of the value of Al/Ti is preferably 0.8, and the upper limit thereof is preferably 1.0.

Mo:

The Mo component has an effect of improving high-temperature tensile characteristics, low-cycle fatigue characteristics and rupture characteristics through solid solution in a matrix (γ phase). This effect exerts a combined effect, particularly, by coexistence with W. Furthermore, the Mo component forms a $M_6C$-type carbide with C and strengthens a grain boundary while suppressing grain growth. The Mo component also has an effect of contributing to the granulation of grains by the exertion and progression of recrystallization. A content of not more than 5.5% cannot confer sufficient high-temperature ductility and low-cycle fatigue characteristics. On the other hand, a content of more than 10.0% is not preferred because the Mo component contained reduces hot workability and incurs embrittlement by precipitating a harmful phase such as a μ phase. Thus, the content of Mo is set to more than 5.5% and not more than 10.0%. For more reliably obtaining the effect of Mo, the lower limit is preferably 6.0%, more preferably 6.3%, still more preferably 6.9%. The upper limit of Mo is preferably 8.0%, more preferably 7.4%.

W:

The W component has an effect of improving high-temperature tensile characteristics, low-cycle fatigue characteristics and rupture characteristics through solid solution in a matrix (γ phase) and a γ' phase. In addition, the W component exerts composite strengthening through solid solution strengthening in the matrix by coexistence with Mo. Furthermore, the W component forms a $M_6C$-type carbide with C and strengthens a grain boundary while suppressing grain growth. The W component also has an effect of contributing to the granulation of grains by the exertion and progression of recrystallization. The W component, if not contained, cannot confer sufficient low-cycle fatigue characteristics. On the other hand, a content of more than 4.0% is not preferred because hot workability is reduced and also ductility is reduced. Thus, W is contained within the range of at most 4.0% (i.e., more than 0% to 4.0%). To more reliably obtain the effect of W, the lower limit is preferably 1.1%, more preferably 1.7%. The upper limit of W is preferably 2.7%, more preferably 2.3%.

The quantitative ratio between Mo and W is preferably not more than 4.6 in terms of a value of Mo/W.

This is because a Mo/W ratio of more than 4.6 reduces the effect of the combined addition of Mo and W which contribute to strength characteristics. The lower limit of the value of Mo/W is preferably 3.5, and the upper limit thereof is preferably 4.3.

B:

The B component has an effect of improving grain boundary strength by forming an $M_3B_2$-type boride with Cr, Mo, or the like and also has an effect of suppressing the growth of grains. A content of less than 0.001% cannot produce a sufficient grain boundary strengthening function and grain boundary flux pinning due to an insufficient amount of the boride produced. On the other hand, more than 0.04% of the B component contained is not preferred because hot workability, weldability, ductility, etc. are reduced due to too excessive an amount of the boride produced. Thus, the content of B is set to 0.001 to 0.040%. For more reliably obtaining the effect of B, the lower limit is preferably 0.003%, more preferably 0.004%. The upper limit of B is preferably 0.020%, more preferably 0.015%.

C:

The C component forms an $M_6C$-type or an MC-type carbide having flux pinning with Ti, Mo, or the like and suppresses grain growth. The C component contributes to the granulation of grains by the exertion and progression of recrystallization and has an effect of improving grain boundary strength. Furthermore, the C component has an effect of strengthening a grain boundary by newly producing an $M_{23}C_6$-type carbide through aging treatment. A content of less than 0.02% cannot produce a sufficient grain boundary strengthening function and grain boundary flux pinning due to an insufficient precipitation ratio of the $M_6C$-type or MC-type carbide. On the other hand, more than 0.06% of the C component contained is not preferred because hot workability, weldability, ductility, etc. are reduced due to too excessive an amount of the carbide produced. Thus, the content of C is set to 0.02 to 0.06%. For more reliably obtaining the effect of C, the lower limit is preferably 0.025%, more preferably 0.035%. The upper limit of C is preferably 0.055%, more preferably 0.050%.

Zr:

The Zr component has an effect of improving grain boundary strength, as in B, and can therefore be contained, if necessary. A Zr content of more than 0.05% decreases a melting point and inhibits high-temperature strength and hot workability. Thus, the content of Zr is set to 0 to 0.05%. For reliably obtaining the effect of the addition of Zr, the lower limit is preferably 0.005%. The upper limit of Zr contained is preferably 0.03%.

Mg:

The Mg component has an effect of improving hot ductility by fixing, as a sulfide, S which is an inevitable impurity segregating at a grain boundary and inhibiting hot ductility, and can therefore be contained, if necessary. At a Mg content of more than 0.005%, an excess of Mg becomes a factor inhibiting hot ductility. Thus, the content of Mg is set to 0 to 0.005%. For reliably obtaining the effect of the addition of Mg, the lower limit is preferably 0.0002%. The upper limit of Mg contained is preferably 0.003%.

P:

P improves rupture characteristics by segregating at a grain boundary and increasing grain boundary strength and can therefore be contained, if necessary. More than 0.01% of P forms a harmful phase and inhibits hot workability or high-temperature corrosion resistance. Thus, the content of P is set to 0 to 0.01%. For reliably obtaining the effect of the addition of P, the lower limit is preferably 0.0002%. The upper limit of P contained is preferably 0.005%.

Nb:

The Nb component has an effect of improving high-temperature tensile characteristics, low-cycle fatigue characteristics and rupture characteristics through solid solution in a matrix ($\gamma$ phase) and a $\gamma'$ phase and bringing about high-temperature strength, and is therefore added, if necessary. A content of more than 1.0% reduces hot workability and is therefore not preferred. Thus, the content of Nb is set to 0 to 1.0%. For reliably obtaining the effect of the addition of Nb, the lower limit is preferably 0.005%. The upper limit of Nb contained is preferably 0.2%.

Ta:

The Ta component has an effect of improving high-temperature tensile characteristics, low-cycle fatigue characteristics and rupture characteristics through solid solution in a matrix ($\gamma$ phase) and a $\gamma'$ phase and bringing about high-temperature strength, as in Nb, and is therefore added, if necessary. A content of more than 1.0% reduces hot workability and is therefore not preferred. Thus, the content of Ta is set to 0 to 1.0%. For reliably obtaining the effect of the addition of Ta, the lower limit is preferably 0.002%. The upper limit of Ta contained is preferably 0.2%.

Fe:

The Fe component is inexpensive and affordable and has an effect of improving hot workability and is therefore added, if necessary. A content of more than 2.0% deteriorates high-temperature strength and therefore is not preferred. Thus, the content of Fe is set to 0 to 2.0%. For reliably obtaining the effect of the addition of Fe, the lower limit is preferably 0.01%, more preferably 0.02%. The upper limit of Fe contained is preferably 0.6%.

Solvus Temperature T1 of $M_6C$-Type Carbide and Solvus Temperature T2 of $\gamma'$ Phase:

In this invention, an ingot made of the Ni-based heat resistant superalloy is hot-forged to obtain a forged billet. Then, the forged billet is further subjected repetitively to hot working such as hot forging and hot rolling to prepare an aircraft engine case. A high-strength $\gamma$-$\gamma'$-type Ni-based heat resistant superalloy has high deformation resistance when the hot working temperature is equal to or lower than solvus temperature T2 of the $\gamma'$ phase. Therefore, the hot working can be performed in a temperature range exceeding the solvus temperature T2 of the $\gamma'$ phase. Partial or complete grain growth occurs by heating at a temperature immediately below the solvus temperature T2 of the $\gamma'$ phase, or a higher temperature. This may be responsible for the inhomogeneity of a microstructure or strength characteristics. Particularly, fine grains are desirable from the viewpoint of improving low-cycle fatigue characteristics. However, an event also arises in which some coarse grains largely influence the number of cycles to failure even if an average distribution has fine grains.

Accordingly, for obtaining a homogeneous microstructure, it is desirable to set solvus temperature T1 of an $M_6C$-type carbide to near the solvus temperature T2 of the $\gamma'$ phase so that a tendency for increased grain growth associated with the disappearance of the $\gamma'$ phase is suppressed by the dispersion of the $M_6C$-type carbide.

As a result of conducting various studies, the present inventors have also found that a difference between solvus temperature T1 of an $M_6C$-type carbide and solvus temperature T2 of a $\gamma'$ phase (T1-T2) calculated from thermodynamic equilibrium calculation based on the composition of the Ni-based heat resistant superalloy, for example, by the CALPHAD method, satisfies $-30°\ \text{C.} \leq (\text{T1-T2}) \leq +40°\ \text{C.}$, preferably $-20°\ \text{C.} \leq (\text{T1-T2}) \leq +20°\ \text{C.}$, whereby cracking is less likely to occur during plastic working; a homogeneous microstructure such as a grain size and a precipitation phase is obtained even at a low working rate; and in addition, the dispersion of the $M_6C$-type carbide not only has an effect of suppressing grain growth but creates a recrystallization site and has an effect of facilitating recrystallization even under conditions of a small apparent working rate.

However, at $(\text{T1-T2}) < -30°\ \text{C.}$, the $M_6C$-type carbide brings about no effect of compensating for the disappearance of the $\gamma'$ phase in a hot working temperature range. Also, at $+40°\ \text{C.} < (\text{T1-T2})$, the $M_6C$-type carbide has a strong tendency to be dispersed coarsely and nonuniformly and is less effective. Hence, $-30°\ \text{C.} \leq (\text{T1-T2}) \leq +40°\ \text{C.}$ is preferably satisfied.

More preferably, $-20°\ \text{C.} \leq (\text{T1-T2}) \leq +20°\ \text{C.}$ is satisfied. Further preferably, the lower limit is $-15°\ \text{C.}$, and the upper limit is $+10°\ \text{C.}$ Thus, for the Ni-based heat resistant superalloy of the present invention, the ASTM grain size number can be at least 6 and is preferably at least 7, more preferably at least 8, and further preferably at least 9. The grain size in a product after working, such as an aircraft engine case, of the Ni-based heat resistant superalloy of the present invention is preferably up to 30 µm, more preferably up to 20 µm, and further preferably up to 10 µm.

EXAMPLES

Next, the Ni-based heat resistant superalloy of this invention will be specifically described with reference to Examples.

Example 1

10 kg of a liquid Ni-based heat resistant superalloy for aircraft engine cases was melted and adjusted according to the predetermined target component composition shown in Table 1 using a usual high-frequency vacuum induction melting furnace. The product was cast to prepare a cylindrical ingot having a diameter of 100 mm. The ingot was subjected to soaking treatment with the highest heating temperature of 1200° C. Then, blooming forging and hot swaging working were performed at a pre-plastic working heating temperature of 1080 to 1150° C. to prepare a hot-worked round bar material having a diameter of 14 mm.

Table 1 shows a difference between solvus temperature T1 of an $M_6C$-type carbide, solvus temperature T2 of a γ' phase, and a difference between the solvus temperature T1 of the $M_6C$-type carbide and the solvus temperature T2 of the γ' phase (T1-T2) calculated from thermodynamic equilibrium calculation based on the target component composition by the CALPHAD method, and also shows a value of an Al equivalent calculated according to Al equivalent=Al+0.56×Ti.

TABLE 1

| No. | Cr | Fe | Co | Mo | W | Al | Ti | Al + Ti | Al equivalent | C | B | Zr | Mg | P | Ni and inevitable impurities | T2 | T1 | T1 − T2 |
|---|---|---|---|---|---|---|---|---|---|---|---|---|---|---|---|---|---|---|
| 1 | 14.25 | 0.00 | 9.00 | 7.10 | 1.90 | 2.75 | 3.10 | 5.85 | 4.49 | 0.040 | 0.010 | 0.020 | 0.0020 | 0.001 | Balance | 1088 | 1082 | −6 |
| 2 | 14.25 | 0.00 | 9.00 | 6.80 | 1.65 | 2.50 | 2.85 | 5.35 | 4.10 | 0.040 | 0.010 | 0.020 | 0.0020 | 0.001 | Balance | 1064 | 1073 | 9 |
| 3 | 13.50 | 0.00 | 9.00 | 7.10 | 1.90 | 2.75 | 3.10 | 5.85 | 4.49 | 0.040 | 0.010 | 0.020 | 0.0020 | 0.001 | Balance | 1086 | 1086 | 0 |
| 4 | 14.25 | 0.00 | 9.75 | 7.10 | 1.90 | 2.75 | 3.10 | 5.85 | 4.49 | 0.040 | 0.010 | 0.020 | 0.0020 | 0.001 | Balance | 1089 | 1077 | −12 |

Subsequently, this hot-worked round bar material was subjected to solution treatment involving holding at 1080° C. for 1 hour followed by air cooling to prepare a solution-treated material.

Subsequently, the solution-treated material was subjected to aging treatment involving holding at 760° C. for 24 hours followed by air cooling to prepare Ni-based heat resistant superalloy Nos. 1 to 4 of the present invention.

The difference between the solvus temperature T1 of the $M_6C$-type carbide and the solvus temperature T2 of the γ' phase (T1-T2) ranged from −15 to +10, all of which fell within the range of −30° C. to +40° C. (within the preferred range of −20° C. to +20° C.).

The Ni-based heat resistant superalloys Nos. 1 to 4 of the present invention thus prepared were subjected to a high-temperature tensile test and a low-cycle fatigue (LCF) test and examined for their characteristics.

High-Temperature Tensile Test:

A round bar test specimen having a dimension of parallel portion diameter: 6.35 mm, parallel portion length: 36 mm, and gage length: 25.4 mm was collected from each of the Ni-based heat resistant superalloys Nos. 1 to 4 of the present invention. The high-temperature tensile test was conducted at a temperature of 750° C. according to ASTM E21 using the test specimen to measure tensile strength (MPa).

Table 2 shows these measurement results.

From the results of this high-temperature tensile test, it is evident that all the Ni-based heat resistant superalloys Nos. 1 to 4 of the present invention exhibit tensile strength of not less than 1000 MPa (more exactly, not less than 1020 MPa) in the tensile test at 750° C. and have excellent high-temperature strength. Among others, it is evident that the Ni-based heat resistant superalloys Nos. 1, 3 and 4 of the present invention with Al and Ti contents adjusted to more proper ranges obtained tensile strength of not less than 1060 MPa.

Low-Cycle Fatigue (LCF) Test:

A round bar test specimen having a dimension of parallel portion diameter: 6.35 mm, parallel portion length: 18.5 mm, and gage length: 12 mm was collected from each of the Ni-based heat resistant superalloys Nos. 1 to 4 of the present invention. The low-cycle fatigue (LCF) test was conducted under strain control conditions of temperature: 750° C., strain ratio: A=1 (pulsating), total strain range: $_\Delta\varepsilon$ (total)=0.6%, repetitive waveform: triangle wave, and repetition frequency: 0.5 Hz according to ASTM E606 using the test specimen to measure the number of cycles to failure of the test specimen.

Table 2 shows the results.

From the results of this low-cycle fatigue (LCF) test, it is evident that all the Ni-based heat resistant superalloys Nos. 1 to 4 of the present invention exhibit the number of cycles to failure (Nf) of not less than $1.0\times10^5$ in the low-cycle fatigue (LCF) test in a total strain range of 0.6% at 750° C. and have excellent low-cycle fatigue (LCF) characteristics.

Among others, the Ni-based heat resistant superalloys Nos. 1, 3 and 4 of the present invention with Al and Ti contents adjusted to more proper ranges exhibited the number of cycles to failure (Nf) of not less than $2.0\times10^5$. These Ni-based heat resistant superalloys Nos. 1, 3 and 4 of the present invention were alloys in which the difference between the solvus temperature T1 of the $M_6C$-type carbide and the solvus temperature T2 of the γ' phase (T1-T2) was 0 or below 0.

In order to evaluate good or poor hot workability (deformability) of the Ni-based heat resistant superalloy of the present invention, a high-strain rate tensile test was conducted on a forging material.

First, an evaluation material was subjected to material heating treatment into a heated state prior to forging and rolling.

Subsequently, a round bar test specimen having a parallel portion diameter of 6 mm and a parallel portion length of 60 mm was prepared from the material. The high-temperature high-strain rate tensile test involving temporary heating to a material heating treatment temperature by direct resistance heating, then cooling to a predetermined test temperature (or keeping at the temperature when the test temperature was the same as the material heating treatment temperature), and pulling at a strain rate of 1/S was conducted to measure a value of reduction of area as an indicator for hot deformability.

The same test was conducted on Waspaloy-equivalent alloy and Alloy 720LI, and the obtained data was compared.

In this context, the typical composition of Alloy 720LI (conforming to UNS N07720) is, by mass, Cr: 15.5 to 16.5%, Co: 14.0 to 15.5%, Mo: 2.75 to 3.25%, W: 1.00 to 1.50%, Ti: 4.75 to 5.25%, Al: 2.25 to 2.75%, C: 0.01 to 0.02%, Zr: 0.025 to 0.05%, and B: 0.01 to 0.02%, and the balance of Ni with inevitable impurities.

The γ' solvus temperature/material heating treatment temperature/reduction of area at the material heating treatment temperature/temperature range attained ≥60% reduction of area is 1088° C./1100° C./90%/1025 to 1100° C. for the Ni-based heat resistant superalloy of the present invention, 1045° C./1050° C./100%/925 to 1050° C. for Waspaloy-equivalent alloy, and 1160° C./1150° C./0%/1100° C. for Alloy 720LI.

Waspaloy-equivalent alloy having relatively high hot workability had a high value of reduction of area even in a state heated near the γ' solvus temperature (+5° C. with respect to the calculated value of the γ' solvus temperature) and had a wide temperature range attaining at least 60% reduction of area, a reported indicator for favorable deformability, whereas Alloy 720LI reportedly having high strength but low hot deformability had 0% reduction of area in a state heated near the γ' solvus temperature (−10° C. with respect to the calculated value of the γ' solvus temperature) and had a very narrow temperature range around 1100° C. for 60% reduction of area. Alloy 720LI exhibited no reduction of area even when treated at a temperature lower than the γ' solvus temperature and pulled.

On the other hand, the Ni-based heat resistant superalloy of the present invention obtained high reduction of area even at γ' solvus temperature+12° C.

From the results of the high-strain rate tensile test, it can be confirmed that the Ni-based heat resistant superalloy of the present invention has much higher deformability than that of Alloy 720LI, as in Waspaloy-equivalent alloy.

In terms of the nature of the test, the temperature range attaining 60% reduction of area was interpolated and estimated from a temperature at which a numeric value around 60% was obtained by conducting the test at a plurality of temperatures.

TABLE 2

| Alloy No. | High-temperature tensile characteristics (750° C.) Tensile strength (MPa) | Low-cycle fatigue characteristics (750° C.) | |
|---|---|---|---|
| | | $\Delta\varepsilon$ total(%) | Nf (cycles) |
| 1 | 1,080 | 0.6 | 212,580 |
| 2 | 1,042 | 0.6 | 154,190 |
| 3 | 1,078 | 0.6 | 218,470 |
| 4 | 1,084 | 0.6 | 255,977 |

Example 2

Next, a material for engine cases was prepared using a Ni-based heat resistant superalloy for aircraft engine cases based on the target component composition represented by No. 1. This material was designated as "No. A", and its composition (unit: % by mass) is shown in Table 3. Solvus temperature T1 of a M6C-type carbide and solvus temperature T2 of a γ' phase calculated from thermodynamic equilibrium calculation based on the composition of the Ni-based heat resistant superalloy by the CALPHAD method are 1081° C. and 1084° C., respectively.

An ingot having the composition shown in Table 3 and a diameter of 500 mm, melted by double melting consisting of high-frequency vacuum induction melting and consumable electrode vacuum remelting was subjected to homogenization treatment and then blooming-forged with an oil hydraulic press to prepare a billet having a diameter of 260 mm.

A cylindrical material having a diameter of 220 mm was collected from the billet and rough-forged at 70% forging reduction to obtain a disk-like material having a diameter of approximately 400 mm, which was then made into a hollow cylindrical shape by mechanical working. This material was subjected to ring rolling at a total of 55% reduction of wall thickness by 3 heats to obtain a ring material having an outside diameter of 580 mm. No cracking occurred in the rough forging, and cracking occurred in the ring rolling but was slight. No problem arose during the hot working process from the viewpoint of obtaining the desired ring material. Subsequently, the material was subjected to solution treatment involving holding at 1080° C. for 1 hour followed by air cooling, and aging treatment involving holding at 760° C. for 24 hours followed by air cooling.

Then, high-temperature tensile strength and low-cycle fatigue strength were measured under the same conditions as in Example 1. The results are shown in Table 4.

Since the experiment was conducted on a mass scale, microstructure differs from that of Example 1 mentioned above depending on amount of residual strain, working temperature, and cooling rate after working. Nonetheless, as shown in Table 4, the Ni-based heat resistant superalloy of the present invention exhibited tensile strength of not less than 1000 MPa (more exactly, not less than 1020 MPa) in the tensile test at 750° C. and had excellent high-temperature strength. Also, the Ni-based heat resistant superalloy of the present invention exhibited the number of cycles to failure (Nf) of not less than $1.0 \times 10^5$ (more accurately, not less than $1.5 \times 10^5$) in the low-cycle fatigue (LCF) test in a total strain range of 0.6% at 750° C. and had excellent low-cycle fatigue (LCF) characteristics.

From these results, it is evident that the Ni-based heat resistant superalloy for aircraft engine cases of the present invention has excellent tensile characteristics and low-cycle fatigue characteristics in a high-temperature range as well as excellent workability.

TABLE 4

| High-temperature tensile characteristics (750° C.) | Low-cycle fatigue characteristics (750° C.) | |
|---|---|---|
| Tensile strength (MPa) | $\Delta\varepsilon$ total(%) | Nf (cycles) |
| 1,037 | 0.6 | 196,780 |

TABLE 3

| No. | Cr | Fe | Co | Mo | W | Al | Ti | Al + Ti | Al equivalent | C | B | Zr | Mg | P | Nb | Ta | Ni and inevitable impurities |
|---|---|---|---|---|---|---|---|---|---|---|---|---|---|---|---|---|---|
| A | 14.61 | 0.04 | 8.36 | 6.88 | 1.91 | 2.75 | 305 | 5.80 | 4.46 | 0.050 | 0.004 | <0.01 | 0.0004 | — | 0.03 | <0.01 | Balance |

"—" in the table means not added.

Example 3

Next, characteristics were compared between the Ni-based heat resistant superalloy of the present invention and a conventional Ni-based heat-resistant alloy.

A forging material of a Ni-based heat resistant superalloy having the component composition of No. A shown in Table 3 (also referred to as "Alloy A") was used as an example of the Ni-based heat resistant superalloy of the present invention.

A case material prepared from Waspaloy-equivalent alloy, a forging material prepared from Alloy 720LI, and a forging material prepared from Alloy B were used as examples of the conventional Ni-based heat-resistant alloy.

In this context, Alloy B is a comparative material, and its composition is, by mass, Cr: 13.50%, Co: 3.00%, Mo: 6.10%, W: 1.50%, Al: 2.85%, Ti: 3.50% (Al equivalent: 4.81), C: 0.040%, B: 0.0040%, and Mg: 0.0010%, and the balance of Ni with inevitable impurities.

First, an ingot of each of the alloys having a diameter of 500 mm, melted by double melting consisting of high-frequency vacuum induction melting and consumable electrode vacuum remelting was subjected to homogenization treatment and then blooming-forged with an oil hydraulic press to prepare a billet having a diameter of 260 mm. A cylindrical material having a diameter of 205 mm was collected from the billet and hot-die forged at 80% forging reduction with an oil hydraulic press to obtain a disk-like forging material made of Alloy A or Alloy B having a diameter of approximately 440 mm.

As for Alloy 720LI, an ingot having a diameter of 500 mm, melted by triple melting consisting of high-frequency induction vacuum melting, electroslag remelting and consumable electrode vacuum remelting was subjected to homogenization treatment and then blooming-forged with an oil hydraulic press to prepare a billet having a diameter of 254 mm. The material was hot-die forged at 80% forging reduction with an oil hydraulic press to obtain a disk-like forging material having a diameter of approximately 440 mm.

As for Waspaloy-equivalent alloy, a cylindrical material having a diameter of 250 mm was collected from the billet mentioned above and rough-forged to obtain a hollow cylindrical material having a diameter of approximately 500 mm, which was then subjected to ring rolling at a total of at least 50% reduction of wall thickness to obtain a case material having a maximum outside diameter of substantially 1100 mm.

For Alloy A, the heating temperature in all the steps of plastic working was set to be equal to or higher than solvus temperature T2 of a γ' phase reported to facilitate grains generally becoming coarse and mixed grains.

For Alloy A and Alloy B, the material was subjected to solution treatment involving holding at 1080° C. for 1 hour followed by air cooling, and aging treatment involving holding at 760° C. for 24 hours followed by air cooling. For Alloy 720LI, the material was subjected to solution treatment involving holding at 1105° C. for 2 hours followed by water cooling, and aging treatment involving holding at 649° C. for 24 hours followed by air cooling and further holding at 760° C. for 8 hours followed by air cooling. For Waspaloy, the material was subjected to solution treatment involving holding at 1010° C. for 4 hours followed by water cooling, stabilization treatment involving holding at 850° C. for 4 hours followed by air cooling, and aging treatment involving holding at 760° C. for 16 hours followed by air cooling.

Figure 2:
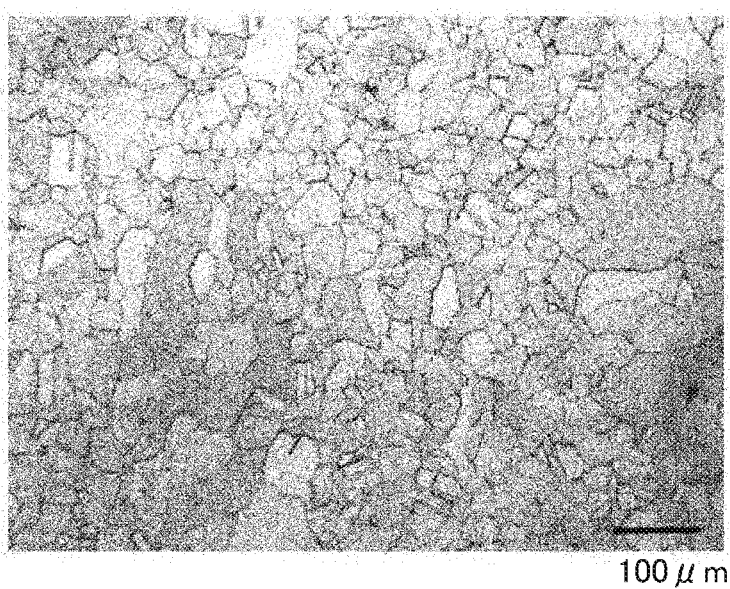
FIG. 2 is a microphotograph showing the microstructure of a conventional alloy (Waspaloy-equivalent alloy).

Test specimens for grain size measurement were collected from the obtained Alloy A of the present invention and Waspaloy-equivalent alloy proven as an alloy for engine cases, and grain size number measurement and microstructure observation were performed. Alloy A had an ASTM grain size number of 7, and the case material made of Waspaloy-equivalent alloy had an ASTM grain size number of 6.5. FIGS. 1 and 2 each show a microphotograph of a site observed under an optical microscope. Although Alloy A and Waspaloy-equivalent alloy had almost equivalent grain size numbers, the microstructure of Alloy A of the present invention had an almost uniform size as shown in FIG. 1, demonstrating that the grains had a controlled size. On the other hand, as shown in FIG. 2, slightly coarser grains were seen in part in the Waspaloy-equivalent alloy.

A test specimen for the high-temperature tensile test having a dimension of parallel portion diameter: 6.35 mm, parallel portion length: 36 mm, and gage length: 25.4 mm was collected from the forging material or the case material of Alloy A, Waspaloy-equivalent alloy, Alloy 720LI and Alloy B. Also, a test specimen for the low-cycle fatigue (LCF) test having a dimension of parallel portion diameter: 6.35 mm, parallel portion length: 18.5 mm, and gage length: 12 mm was collected therefrom.

Each test specimen was examined for its high-temperature tensile characteristics at 750° C. and 800° C. and low-cycle fatigue characteristics at 750° C. in the same way as in Example 1.

A rupture test was also conducted at 750° C. to examine rupture characteristics.

The rupture test was conducted by collecting a round bar test specimen having a dimension of parallel portion diameter: 6.35 mm, parallel portion length: 31.8 mm, and gage length: 25.4 mm from the forging material or the case material of Alloy A, Waspaloy-equivalent alloy, Alloy 720LI and Alloy B, and subjecting this test specimen to the rupture test at a temperature of 750° C. under constant load of 400 MPa initial load stress according to ASTM E139.

Table 5 shows rupture time (indicated by "service life" in Table 5) (h), breaking elongation (%), reduction of area (%) and Larson-Miller parameter ($\times 10^{-3}$).

The constant in the Larson-Miller parameter was 20.

These measurement results are shown in "Initial characteristics" of Table 5.

From the results shown in "Initial characteristics" of Table 5, Alloy A is found to be much superior in high-temperature tensile characteristics, low-cycle fatigue (LCF) characteristics and rupture characteristics to Waspaloy-equivalent alloy. In particular, for the low-cycle fatigue (LCF) characteristics, the Ni-based heat resistant superalloy Alloy A of the present invention exhibited the number of cycles to failure (Nf) of not less than $2.5 \times 10^5$.

When Alloy A is compared with Alloy 720LI, it is evident that the high-temperature tensile characteristics are almost equivalent, whereas Alloy A is much superior in low-cycle fatigue (LCF) characteristics and rupture characteristics.

When Alloy A is compared with Alloy B, it is evident that Alloy A is superior in high-temperature tensile characteristics, low-cycle fatigue (LCF) characteristics and rupture characteristics and is much superior, particularly, in rupture characteristics.

TABLE 5

| Type of alloy | Material | High-temperature tensile characteristics (750° C.) | | | | High-temperature tensile characteristics (800° C.) | | | |
|---|---|---|---|---|---|---|---|---|---|
| | | 0.2% proof strength (MPa) | Tensile strength (MPa) | Elongation (%) | Reduction of area (%) | 0.2% proof strength (MPa) | Tensile strength (MPa) | Elongation (%) | Reduction of area (%) |
| Initial characteristics | | | | | | | | | |
| Alloy A | Forging | 899 | 1,039 | 34.3 | 29.5 | 764 | 902 | 46.0 | 56.0 |
| Waspaloy | Case | 753 | 889 | 42.0 | 61.5 | 590 | 717 | 51.2 | 70.5 |
| Alloy 720LI | Forging | 950 | 1,073 | 15.2 | 16.4 | 706 | 848 | 20.0 | 22.2 |
| Alloy B | Forging | 745 | 968 | 20.6 | 31.9 | 519 | 753 | 27.6 | 70.3 |
| Characteristics after holding at 750° C. for 1000 h | | | | | | | | | |
| Alloy A | Forging | 865 | 1,026 | 42.4 | 58.4 | 724 | 856 | 43.7 | 62.0 |
| Waspaloy | Case | 631 | 834 | 51.2 | 70.5 | 495 | 672 | 60.9 | 76.4 |
| Alloy 720LI | Forging | 838 | 973 | 12.1 | 15.1 | 615 | 764 | 22.0 | 22.9 |

| Type of alloy | Rupture characteristics (750° C./400 MPa) | | | | Low-cycle fatigue characteristics (750° C.) | |
|---|---|---|---|---|---|---|
| | Service life (h) | Elongation (%) | Reduction of area (%) | Larson-Miller Parameter ×10⁻³ | Δε total (%) | Nf (cycles) |
| Initial characteristics | | | | | | |
| Alloy A | 505.9 | 53.5 | 60.7 | 23.23 | 0.6 | 255,110 |
| Waspaloy | 251.7 | 45.6 | 60.4 | 22.92 | 0.6 | 28,930 |
| Alloy 720LI | 176.8 | 49.3 | 73.8 | 22.76 | 0.6 | 82,130 |
| Alloy B | 22.5 | 64.4 | 73.2 | 21.84 | 0.6 | 27,200 |
| Characteristics after holding at 750° C. for 1000 h | | | | | | |
| Alloy A | 458.3 | 52.9 | 68 | 23.18 | 0.6 | 283,410 |
| Waspaloy | 180.8 | 53.1 | 66.6 | 22.77 | 0.6 | 26,840 |
| Alloy 720LI | 110.2 | 55.7 | 77.3 | 22.55 | 0.6 | 54,724 |

The description in the column "Initial characteristics" of Table 5 is about the results of examining the initial characteristics of Alloy A, Waspaloy-equivalent alloy, Alloy 720LI and Alloy B. For the purpose of examining change in characteristics after exposure to a high-temperature environment for a long time, test specimens collected from the forging material or the case material of Alloy A, Waspaloy-equivalent alloy and Alloy 720LI were held at 750° C. for 1000 hours and then examined for their high-temperature tensile characteristics at 750° C. and 800° C., low-cycle fatigue characteristics at 750° C. and rupture characteristics at 750° C.

The column "Characteristics after holding at 750° C. for 1000 h" of Table 5 shows values of characteristics of each test specimen thus held at 750° C. for 1000 hours.

From the results shown in the column "Characteristics after holding at 750° C. for 1000 h" of Table 5, the high-temperature tensile characteristics (0.2% proof strength and tensile strength) of Waspaloy-equivalent alloy and Alloy 720LI were largely reduced with increase in test temperature, and the 0.2% proof strength and the tensile strength were less than 650 MPa and less than 800 MPa, respectively, in their results of the high-temperature tensile characteristics test at 800° C. In contrast, it is evident that Alloy A of the present invention can maintain excellent high-temperature tensile characteristics with 0.2% proof strength of not less than 650 MPa and tensile strength of not less than 800 MPa.

When the initial value of high-temperature tensile characteristics at 750° C. is compared with the value after holding at 750° C. for 1000 hours, it is evident that the 0.2% proof strength and tensile strength of Alloy A were reduced very slightly from the initial values, whereas the amount of such reduction was very large in Waspaloy-equivalent alloy and Alloy 720LI.

When the results of high-temperature tensile characteristics at 800° C. are compared between the initial value and the value after holding at 750° C. for 1000 hours, excellent high-temperature tensile characteristics with 0.2% proof strength of not less than 700 MPa and tensile strength of not less than 850 MPa were obtained in Alloy A held at 750° C. for 1000 hours, although high-temperature tensile characteristics (0.2% proof strength and tensile strength) were slightly reduced from the initial value of the characteristics. It is therefore evident that the Ni-based heat resistant superalloy Alloy A of the present invention, when used at a high temperature, has excellent high-temperature tensile characteristics even if the temperature of the environment in which it is used is elevated.

Thus, the Ni-based heat resistant superalloy of the present invention is found to be suitable as a material for aircraft engine cases desired to have a higher combustion temperature.

As for the low-cycle fatigue (LCF) characteristics, it is evident from the results shown in the column "Characteristics after holding at 750° C. for 1000 h" of Table 5 that Alloy A is much superior in low-cycle fatigue (LCF) characteristics to Waspaloy-equivalent alloy and Alloy 720LI.

When the description in the column "Initial characteristics" of Table 5 is compared with the description in the column "Characteristics after holding at 750° C. for 1000 h" of the table, it is evident that the Ni-based heat resistant superalloy Alloy A of the present invention was improved, albeit slightly, in low-cycle fatigue (LCF) characteristics.

As for the rupture characteristics, it is evident from the results shown in the column "Characteristics after holding at 750° C. for 1000 h" of Table 5 that the Ni-based heat resistant superalloy Alloy A of the present invention is much superior in rupture characteristics to Waspaloy-equivalent alloy and Alloy 720LI.

Example 4

10 kg of a liquid Ni-based heat resistant superalloy for aircraft engine cases as the Ni-based heat resistant superalloy the present invention was melted and adjusted according to each predetermined target component composition of No. 1, No. 3, and No. 4 shown in Table 1 using a usual high-frequency induction vacuum melting furnace. The product was cast to prepare a cylindrical ingot having a diameter of 100 mm. The ingot was subjected to soaking treatment with the highest heating temperature of 1200° C. Then, blooming forging was performed at a pre-plastic working heating temperature of 1080 to 1150° C. to prepare a hot-worked round bar material having a diameter of 35 mm.

As for Waspaloy-equivalent alloy as a conventional example, an ingot having a diameter of 460 mm, melted by double melting consisting of high-frequency induction vacuum melting and electroslag remelting was subjected to homogenization treatment and then blooming-forged with an oil hydraulic press to obtain a billet. A cylindrical material was collected from the billet and forged at 75% forging reduction with an oil hydraulic press to produce a disk-like forging material having a diameter of 200 mm and a thickness of 25 mm.

Static Grain Growth Test

A small sample (having a cubic shape of substantially 15 mm square) was collected by cutting from each of the round bar materials of the Ni-based heat resistant superalloy No. 1, No. 3, and No. 4 of the present invention, and the forging material of Waspaloy-equivalent alloy. The sample was inserted into an electric furnace set to each predetermined temperature, held for 1 hour, then taken out of the furnace, and air-cooled. The microstructure of the sample after heating treatment was observed under an optical microscope to measure a grain size.

Figure 3:
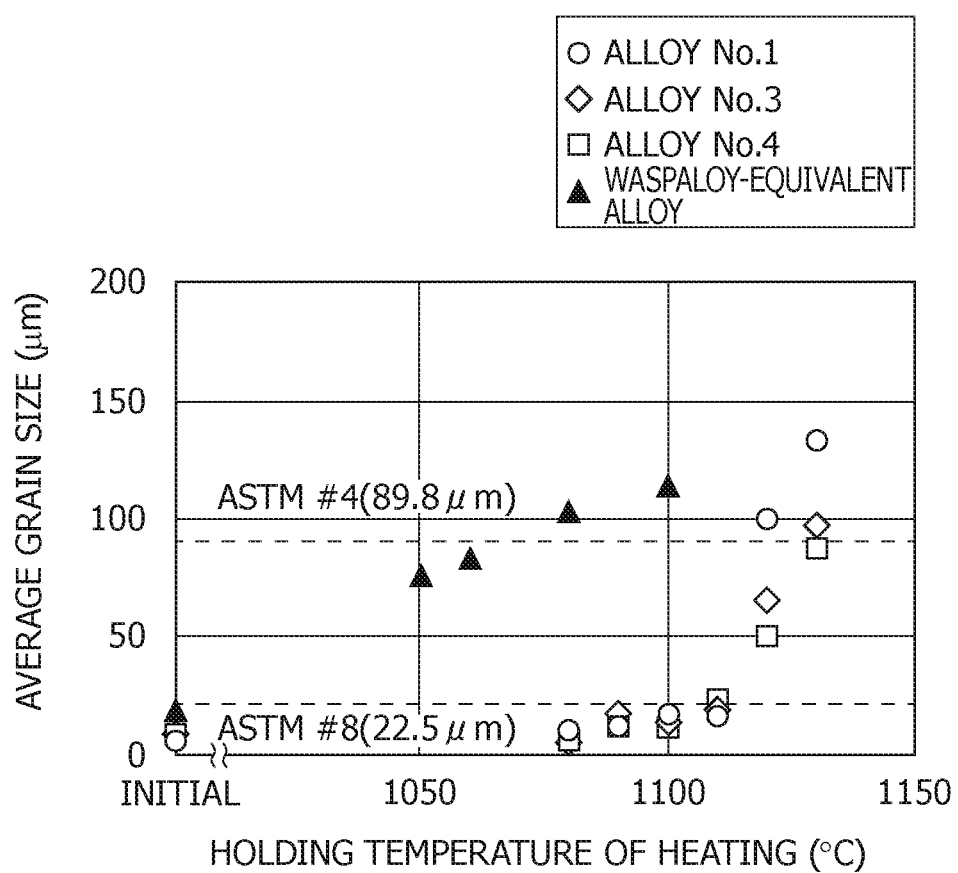
FIG. 3 is a graph showing experimental results about the static grain growth of the alloy of the present invention and the conventional alloy.

These measurement results are shown in Table 6 and FIG. 3.

TABLE 6

| Average crystal grain size of alloy of present invention (μm) | | | | | | | |
|---|---|---|---|---|---|---|---|
| | Holding temperature of heating (° C.) | | | | | | |
| Composition | Initial | 1080 | 1090 | 1100 | 1110 | 1120 | 1130 |
| No. 1 | 5.2 | 9.5 | 11.5 | 16.7 | 16.5 | 99.1 | 134.4 |
| No. 3 | 8.2 | 6.4 | 15.7 | 14.9 | 18.9 | 65.7 | 97.5 |
| No. 4 | 8.9 | 7.4 | 11.9 | 12.9 | 23.3 | 50.0 | 87.7 |

| Average crystal grain size of conventional example (μm) | | | | |
|---|---|---|---|---|
| | Holding temperature of heating (° C.) | | | |
| | 1050 | 1060 | 1080 | 1100 |
| Waspaloy | 18 | 75.8 | 83.1 | 103.4 | 113.5 |

In the static grain growth test, as shown in Table 6 and FIG. 3, the Ni-based heat resistant superalloys No. 1, No. 3, and No. 4 of the present invention maintained fine grains with an ASTM grain size number of at least 8 (corresponding to 22.5 μm or smaller) in terms of an average grain size at a holding temperature of heating of approximately 1115° C. or less, but exhibited a tendency for markedly coarser grains at a higher holding temperature of heating. On the other hand, the grain size of Waspaloy-equivalent alloy was coarser with increase in temperature over the whole range of the holding temperature of heating from 1050 to 1100° C., and its average grain size was around an ASTM grain size number of 4 (corresponding to 89.8 μm). From these results, the behavior of change in grain size against the heating temperature of the alloy of the present invention differed totally from that of the conventional material Waspaloy-equivalent alloy. A heating temperature range for hot plastic working selectable while the coarsening of grains was suppressed was much wider in the alloy of the present invention than in Waspaloy-equivalent alloy. For example, when the grain size at 1100° C. of the alloy of the present invention is compared with that of Waspaloy-equivalent alloy at a holding temperature of heating of 1050° C., the grain size was around 15 μm and approximately 75 μm, respectively, demonstrating that the coarsening of grains ascribable to the holding of heating is effectively suppressed in the alloy of the present invention, and the alloy of the present invention is also excellent in production stability from the viewpoint of grain size control against a heating temperature.

A compression test was further conducted in order to confirm whether the Ni-based heat resistant superalloy of the present invention could obtain such fine grains in a final product after hot working even if the initial state was approximately 100 μm coarse grains. In the same way as in Example 2, an ingot having the composition shown in Table 3 and a diameter of 500 mm, melted by double melting consisting of high-frequency induction vacuum melting and consumable electrode vacuum remelting was subjected to homogenization treatment and then blooming-forged with an oil hydraulic press to prepare a billet having a diameter of 260 mm (Alloy A).

Compression Test

A slice having a thickness of 15 mm was collected from the billet. For the purpose of adjusting a grain size, heating was held at 1120° C. for 1.5 hours to adjust the initial grain size to approximately 100 μm. A compression test specimen having a diameter of 8 mm and a height of 12 mm was collected from the sample thus heated. This compression test specimen was heated to each test temperature and subjected to compression working a total of 4 times at a compression reduction of 10% under conditions of a strain rate of 1 s$^{-1}$. The holding time between the runs of compression working was 2 s. After the fourth run of compression working, the test specimen was held for 2 s and then gas-cooled. A microstructure on the longitudinal section of the test specimen after the compression test was observed under an optical microscope to measure a grain size.

These measurement results are shown in Table 7.

TABLE 7

| | Working conditions | | Grain size (μm) Center |
|---|---|---|---|
| | Temperature | Compression rate | |
| Alloy A | 1090° C. | 10% × 4 | 11.4 *1 |
| | 1100° C. | | 8.0 *2 |
| | 1120° C. | | 8.7 *2 |

*1: recrystallized structure + unrecrystallized structure
*2: recrystallized structure As shown in Table 7, the Ni-based heat resistant superalloy Alloy A of the present invention had a much finer grain size at a working temperature of 1090° C. than the initial grain size, though the average grain size was 11.4 μm due to the influence of some unrecrystallized grains remaining even after compression working. Furthermore, it was confirmed that a very homogeneous fine grain structure with an average grain size of 8.0 to 8.7 μm was obtained at a working temperature of 1100° C. to 1120° C. at which the structure after compression working became a completely recrystallized structure.

INDUSTRIAL APPLICABILITY

The Ni-based heat resistant superalloy for aircraft engine cases of this invention are excellent, particularly in high-temperature characteristics such as high-temperature tensile characteristics and low-cycle fatigue characteristics, can sufficiently suppress deterioration in high-temperature characteristics even when continuously used in a high-temperature environment, and is also excellent in workability and capable of yielding a large member. Therefore, it is expected that the Ni-based heat resistant superalloy for aircraft engine cases of this invention is applied not only to aircraft engine cases, but to other various fields, for example, as a large high-strength ultra-heat-resistant material.

The invention claimed is:

1. An aircraft engine case formed of a Ni-based heat resistant superalloy having a composition containing, by mass,
   Co: 4.0 to 11.0%,
   Cr: 12.0 to 14.8%,
   Al: 2.0 to 4.0%,
   Ti: 2.0 to 4.0%,
   Al+Ti: 4.6 to 6.7%,
   Mo: more than 5.5 to 10.0%,
   W: more than 0 to 4.0%,
   B: 0.001 to 0.040%,
   C: 0.02 to 0.06%,
   Zr: up to 0.05% (including 0%),
   Mg: up to 0.005% (including 0%),
   P: up to 0.01% (including 0%),
   Nb: up to 1.0% (including 0%),
   Ta: up to 1.0% (including 0%),
   Fe: up to 2.0% (including 0%), and
   the balance of Ni with inevitable impurities,
   wherein a difference between solvus temperature T1 of an $M_6C$ carbide and solvus temperature T2 of a γ' phase (T1−T2) calculated from thermodynamic calculation based on the composition of the Ni-based heat resistant superalloy by CALPHAD method satisfies −30° C.≤ (T1−T2)≤+40° C., and
   wherein the Ni-based heat resistant superalloy has a tensile strength at 750° C. of at least 1000 MPa according to ASTM E21 using a test specimen.

2. The aircraft engine case according to claim 1, wherein the number of cycles to failure in a low-cycle fatigue test in a total strain range of 0.6% at 750° C. is at least 1.0×10$^5$.

3. The aircraft engine case according to claim 1, wherein in the composition, Al+Ti is 5.2 to 6.7% by mass.

* * * * *

UNITED STATES PATENT AND TRADEMARK OFFICE
CERTIFICATE OF CORRECTION

| | |
|---|---|
| PATENT NO. | : 11,519,056 B2 |
| APPLICATION NO. | : 16/970887 |
| DATED | : December 6, 2022 |
| INVENTOR(S) | : Matsui et al. |

It is certified that error appears in the above-identified patent and that said Letters Patent is hereby corrected as shown below:

In the Specification

Column 13, Line 26: Please correct "60%" to read --$\geq$60%--

Column 13, Table 3: Please correct "305" to read --3.05--

Column 14, Line 14: Please insert a paragraph break between "580 mm." and "No"

Signed and Sealed this
Twenty-eighth Day of March, 2023

*Katherine Kelly Vidal*

Katherine Kelly Vidal
*Director of the United States Patent and Trademark Office*